United States Patent [19]

Gustafsson et al.

[11] Patent Number: 4,696,910
[45] Date of Patent: Sep. 29, 1987

[54] CATALYST ELEMENT, A PROCESS FOR THE PREPARATION THEREOF AS WELL AS A USE THEREOF

[75] Inventors: Hans Gustafsson, Lidingö; Stephan Schwartz, Vaxholm; Karl-Bertil Widén, Åkersberga, all of Sweden

[73] Assignee: Electro Cell AB, Åkersberga, Sweden

[21] Appl. No.: 800,597

[22] PCT Filed: Mar. 8, 1985

[86] PCT No.: PCT/SE85/00105
§ 371 Date: Oct. 31, 1985
§ 102(e) Date: Oct. 31, 1985

[87] PCT Pub. No.: WO85/04118
PCT Pub. Date: Sep. 26, 1985

[30] Foreign Application Priority Data

Mar. 19, 1984 [SE] Sweden ............................ 8401515

[51] Int. Cl.[4] .............................................. B01J 31/06
[52] U.S. Cl. ..................................... 502/159; 502/527; 562/433
[58] Field of Search ............................. 502/159, 527

[56] References Cited

U.S. PATENT DOCUMENTS

| | | |
|---|---|---|
| 3,271,322 | 9/1966 | Stiles ............................ 502/159 |
| 3,388,004 | 6/1968 | Rosenblatt .................... 502/159 X |
| 3,481,789 | 12/1969 | Winsel ......................... 502/159 X |
| 4,078,893 | 3/1978 | Gilman et al. ................. 502/159 X |
| 4,228,034 | 10/1980 | Butler et al. .................. 502/527 X |
| 4,259,209 | 3/1981 | Nakane et al. ................. 502/159 |
| 4,350,610 | 9/1982 | June et al. .................... 502/159 |
| 4,560,671 | 12/1985 | Gross et al. ................... 502/109 X |

FOREIGN PATENT DOCUMENTS

| | | |
|---|---|---|
| 0066676 | 12/1982 | European Pat. Off. . |
| 0085350 | 8/1983 | European Pat. Off. . |
| 2104019 | 11/1978 | Fed. Rep. of Germany . |
| 2835943 | 3/1980 | Fed. Rep. of Germany . |
| 7114167-5 | 3/1978 | Sweden . |

OTHER PUBLICATIONS

Derwent's Abstract 73066B/40, SU-593-351 (Topchiev Petrochem Synth.) Mar. 11, 1979.

Primary Examiner—Patrick P. Garvin
Attorney, Agent, or Firm—Burns, Doane, Swecker & Mathis

[57] ABSTRACT

A catalyst element is described which is intended for use in a reactor for a chemical reaction where a lyophobic fluid is contacted with a lyophilic fluid for a reaction in the presence of catalyst in said element. The essential feature of the elements is that it is in the form of a porous lyophobic, e.g. hydrophobic, body which has a pore size essentially below 20 μm, and is provided with a surface layer having a thickness of at most 100 μm of lyophilic, e.g. hydrophilic, catalyst particles with a size essentially below 50 μm, across part of its periphery only, said catalyst layer having been formed by sintering and/or pressing the catalyst particles into the porous lyophobic body.

Preferable shapes of said catalyst element are a plate or a so-called packing element.

Furthermore, a process for the preparation of said element is disclosed, which comprises adhering a surface layer of lyophilic catalyst to part of the periphery of a porous lyophobic body by sintering and/or pressing.

Finally, a use of the element is disclosed where the element is used in a reactor wherein a lyophobic fluid is contacted with a lyophilic fluid for a reaction in the presence of catalyst in said element.

24 Claims, 4 Drawing Figures

CATALYST ELEMENT, A PROCESS FOR THE PREPARATION THEREOF AS WELL AS A USE THEREOF

TECHNICAL FIELD

The present invention relates to the field of catalysts for use in chemical reactions and more specifically to a novel catalyst element intended for use in a reactor wherein a chemical reaction takes place by contacting a lyophobic fluid with a lyophilic fluid to accomplish a reaction in the presence of the catalyst in said element. In this context the element according to the invention has turned out to improve drastically the yield of a gas-liquid reaction, e.g. a liquid phase hydrogenation, but is of value in all cases where a lyophobic reactant is reacted with a lyphilic reactant within or upon the catalyst. Furthermore, the invention relates to a process for the preparation of said elements as well as the use of said element in a reactor wherein a lyophobic fluid is reacted with a lyophilic one.

BACKGROUND OF THE INVENTION

As was mentioned above the present invention has turned out to give considerable advantages in connection with liquid phase hydrogenations, and in view of that the invention will primarily be described and exemplified in connection therewith. However, the idea of the invention is not in any way restricted to this type of reaction but should be generally applicable to chemical reactions of the kind referred to.

Liquid phase hydrogenations are very commonly used processes within the chemical industry, from very large petrochemical plants to small apparatuses of the type that is utilized inter alia within the pharmaceutical industry. In the manufacture of so-called fine or performance chemicals of a complex nature the synthesis method often comprises a large number of stages. Obviously it is of great importance that the yield of each stage will be a maximum yield to have the possibility of obtaining a total yield which is economically competitive. Therefore, the selective action of the catalyst will be decisive in a liquid phase hydrogenation as well as in every other step of the total synthesis. In this connection the problems with reference to liquid phase hydrogenations can be schematically illustrated by means of the following simple example.

A compound B containing a hydroxyl amine group is to be prepared from the corresponding nitro compound A. Through the fact that the desorption of B from the catalyst surface is relatively slow time permits B to be hydrogenated further to the corresponding amine compound C, and in view of that the yield of B will be low. To varying extents this is applicable to many consecutive, catalytic reactions. Variations of hydrogen pressures and temperatures have very small influences upon the yield, which means that the hydrogenation step must be supplemented with an extensive and in some cases energy consuming processing step. From this example it is apparent that already very small improvements as to catalyst efficiency can mean important contribution to and savings in connection with the technique within this field.

An improvement of the technique in connection with catalytical reactions is disclosed in Swedish Lay-Open Print No. 7114167-5. The technique disclosed therein is based on an improvement of the non-wettability of the catalyst carrier, i.e. carbon, by means of at maximum the same amount of polytetrafluoroethylene as of the catalyst carrier. According to said Swedish Lay-Open Print the manufacture of the catalyst particles having improved non-wettability properties is accomplished by mixing said catalyst particles with polytetrafluoroethylene in the form of an emulsion, the water then being evaporated by means of heat to the formation of a pure mixture of catalyst particles and polytetrafluoroethylene. The catalyst particles having improved non-wettability properties can then be utilized in a bed or shaped to an element and give some improvements of the yield as compared to particles which have not been treated in this way to obtain non-wettability.

As to catalysts for e.g., gas-liquid reactions reference can also be made to Derwents Abstracts No. 73066B/40, DE-A-2835943, EP-A1-066 676, EP-A1-085 350, DE-B2-2104019 and U.S. Pat. No. 4,259,209 but neither of these documents discloses or suggests the combination of features which are essential to the present invention as described more in detail below. On the contrary the most relevant of said documents are based on wet methods comprising impregnation with a solution of a precursor of the final catalyst in a solvent, e.g. chloroplatinic acid in acetone, which obviously means a more or less uncontrolled penetration of the catalyst into the porous material and no continuous layer on the surface of the porous carrier but rather some kind of "islands" of the catalyst particles.

DISCLOSURE OF THE INVENTION

In accordance with the present invention it has been shown that considerably improved yields can be obtained in reactions of the above-mentioned type if another structure is imparted to the catalyst element than according to Swedish Lay-Open Print No. 7114167-5. This improvement is of such a kind that it could be called a difference in nature rather than a difference in degree, which opens possibilities never dreamt of within the field of catalytic reactions. The improvement obtained is unexpected in view of the fact that also in the present case the catalyst element comprises a lyophobic and a lyophilic part. However, the structure of the catalyst element is completely different, and apparently the fact that the catalytical reactions take place with other rates and optionally also according to other mechanisms than according to the prior art is ascribable to this novel structure, although the invention is not limited by any specific theory in this connection.

More specifically the catalyst element according to the invention is characterized in that it is in the form of a porous lyophobic, e.g. hydrophobic, body which has a pore size essentially below 20 $\mu$m, and is provided with a surface layer having a thickness of at most 100 $\mu$m of lyophilic, e.g. hydrophilic, catalyst particles with a size essentially below 50 $\mu$m, across part of its periphery only, said catalyst layer having been formed by sintering and/or pressing the catalyst particles into the porous, lyophobic body.

Thus, the present invention is based upon a combination of features which have hitherto not been utilized in this art and which have now been shown to give outstanding reaction rates e.g. in gas-liquid reactions.

In the present case the term "lyophobic" means that between the solid phase, i.e. the porous body, and the fluid referred to there are weak binding forces only (no affinity), while "lyophilic" has the opposite meaning, i.e. that there are strong forces between the solid phase and the fluid (strong affinity) or that the solid phase is easily wetted by the fluid referred to. If said fluid is water the corresponding expressions are "hydrophobic" and "hydrophilic", respectively. Last-mentioned case represents a preferable embodiment of the invention, but the invention is applicable also to other liquids, e.g. when hydrogenating fatty acids. However, in general the invention is useful for all combinations of gas-liquid, liquid-liquid and gas-gas, which means that synonymously to lyophilic-lyophobic the fluids could be said to be essentially non-miscible with each other. From the above-mentioned it can also be gathered that the term "fluid" is utilized in a broad sense, i.e. for liquids as well as gases.

In connection with the invention the term catalyst means a lyophilic catalyst per se or a catalyst supported by a lyophilic carrier. An essential feature in connection with the invention is thus that the catalyst element has the structure of a lyophobic porous part and a lyophilic catalyst. Of importance is also that the catalyst is present merely in the form of a surface layer on the lyophobic, porous material and that said layer does not either cover the whole surface of said porous material, In accordance with the prior art according to Swedish Lay-Open Print No. 7114167-5 it could be expected that a structure of a catalyst element where lyophilic portions are present alternatingly with lyophobic portions throughout the whole element would represent the best conditions for the reaction between for instance a gas and a hydrophilic liquid. On the contrary, however, it has been shown in accordance with the invention that this is not the case and that completely unexpected reaction rates of a completely other order of magnitude are obtained with a structure of the element in accordance with the present invention.

From the above-mentioned it can be gathered that a surface layer of catalyst means that the major part of portion of the catalyst, e.g. more than 50% by weight thereof, should not be embedded so deeply in the lyophobic material that the separate catalyst particles will be completely surrounded by lyophobic material but that merely part of their peripheries are in direct contact with the lyophobic material. Therefore, a suitable method of preparation for an element according to the invention means that, which is also disclosed more in detail below, a porous element of the lyophobic material is firstly manufactured and that said element is subsequently coated with a catalyst layer in any suitable way.

Another consequence of the above-mentioned is that the catalyst layer should not be made especially thick, as this does not give any further contribution to the improvement of the reaction rates but with time tends to lower the rate again due to a longer way of transportation for the lyophilic fluid. This also means that the catalyst costs can be reduced by means of the present invention, which also means an important contribution to the art within this field, since these costs as is well known are generally high. Therefore, the thickness of the catalyst layer is at most 100 $\mu$m, preferably at most 50 $\mu$m, and it should preferably be within the range of 5-25 $\mu$m and even within the range of 5-15 $\mu$m.

Another important feature of the invention is that the catalyst layer has been formed by a "dry" technique, as obviously another structure is obtained thereby as compared to previously known "wet" techniques, in addition to the fact that this of course also means a much simpler and cheaper method of manufacture. One embodiment of this dry technique means that the catalyst layer of the element has been formed by the sintering of catalyst particles into the porous, lyophobic body. In this case the catalyst particles are preferably not only loosely applied onto the surface and then sintered but the sintering operation is preferably performed in connection with a pressing operation such that the catalyst particles are pressed some distance into the lyophobic material. Alternatively mere pressing can be utilized to adhere the catalyst particles to the surface of the porous body. In this context it should also be noted that the term pressing should be interpreted in its broad sense, i.e. the measure need not be made in a press but could of course also be made in any conventional way, e.g. by rolling, etc.

As was mentioned above the catalyst particles have a particle size that is essentially below 50 $\mu$m and that is for instance within the range of 5-10 $\mu$m. In this case the term particle size means the largest extension in any direction. An interesting shape of the particles is the spherical shape, said size being represented by the diameter.

As concerns the porosity of the lyophobic material it is of course desirable to have as high porosity as possible to reduce the transportation time for the lyophobic fluid. However, the upper limit thereof is determined by the requisite strength of the element referred to, which must be decided for each separate case. Generally, however, a porosity within the range of 20-50% can be suitable, but higher values and even very high values, exceeding 90%, can be useful in certain cases where the strength requirements can be lowered.

A suitable material for the lyophobic body is polytetrafluorethylene which has turned out to give superior results in experiments, but the inventive idea is applicable to any other type of lyophobic, preferably hydropholic, material to which the desired porosity can be imparted, e.g. other plastics or polymeric materials.

With reference to the catalyst it is often easily available in the form of catalyst particles supported on an inert carrier, and such catalyst particles have turned out to be well suited for utilization at the invention. Examples of such catalysts are palladium on alumina and palladium on carbon.

Many different shapes or configurations can be imparted to the catalyst element according to the invention, but a specially interesting shape is a plate, said plate being provided with the surface layer of the catalyst across the part thereof which is intended to contact the lyophilic fluid, Thus, porous catalyst plates are useful in chemical reactors having a filter-press configuration where the lyophilic fluid is allowed to pass on one side of the plate, in this case the catalyst-coated part thereof, and the lyophobic fluid is allowed to pass on the opposite side thereof. Such plates are preferably mounted in plastic frames in any desired number, where every second flow is a lyophilic fluid and every second is a lyopobic one. These fluids can be passed in the same direction or in the opposite direction relative to each other, i.e. concurrently or countercurrently respectively.

Another interesting use of the catalyst element according to the invention is as a so-called packing element for use in a packed column. In this case any of those shapes which are conventional within the field of packed columns can be imparted to said element. Such columns are often used by feeding a gas at the bottom and liquid at the top thereof, i.e. counter current conditions are used. The matter how great portion or part of the periphery of said packing elements which should be coated by a surface layer of the catalyst to obtain optimum results at this use is decided by a person skilled in the art in each separate case.

Moreover, the invention relates to a process for the preparation of the above-mentioned catalyst element. As was mentioned above a preferable process means that a surface layer of catalyst is sintered across or over a part of the periphery of the porous lyophobic body. This can for instance be accomplished by simply strewing or spreading catalyst particles over that part of the surface of the lyophobic material which is to be coated and then performing a heating operation up to the sintering temperature of the material referred to to sinter the catalyst particles into the surface. In connection therewith there is preferably also used a pressing operation to press catalyst particles some distance into the lyophobic material. Said pressing operation, i.e. while the material is in a cold state. Furthermore, it is possible, as has already been mentioned, to utilize mere pressing.

Finally, the invention relates to a use of the catalyst element described above in a reactor intended for a chemical reaction where a lyophobic fluid is brought into contact with a lyophilic fluid for a reaction in the presence of the catalyst within the element.

As was mentioned above a preferable use in this connection is the use of the catalyst element in the form of a plate in a chemical reactor wherein the lyophilic fluid is contacted with the lyophobic fluid from opposite sides of said plate, that part of the plate which is provided with the surface layer of the catalyst being faced towards the lyophilic fluid.

Another embodiment of said use is the use of the catalyst element in the form of a packing element in a packed column where a lyophobic fluid is contacted with a lyophilic one.

DRAWINGS

The invention will now be described more in detail in connection with the accompanying drawings, on which FIG. 1a shows schematically the structure of a catalytic element according to the prior art;

EXPERIMENT I

Figure 1A:
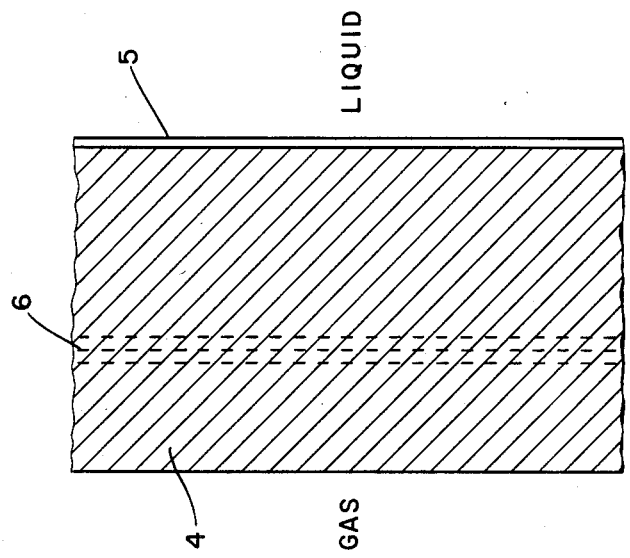
FIG. 1b shows schematically the structure of a catalytic element according to the present invention.

A number of experiments were performed with the catalyst element in the form of plates to hydrogenate p-nitro benzoic acid to p-amino benzoic acid in the presence of palladium as a catalyst, the experimental conditions and results being the following:

MATERIALS OF THE CATALYST PLATES

The material consisted of an inert hydrophobic powder and active metal on different types of carrier powders. Said inert powder consisted of non-porous particles with a size of 30–50 $\mu$m. The carrier particles were porous (average pore diameter 10 nm) and had a particle size of about 5 $\mu$m.

The catalytic material utilized was of three different types, of which two are commercially available. These two were 10% of Pd-on-alumina and 10% of Pd-on-carbon. The third type consisted of 1.9% of Pd-on-NiO/SiO$_2$ obtained by impregnating the carrier with palladium(II) chloride solution (500 moles/m$^3$) in concentrated ammonia followed by a drying operation with nitrogen and a reduction operation with hydrogen at 450° C. for 1 hour and 3 hours, respectively.

In addition to said powder materials the plates also contained reinforcing mesh of nickel wire (0.16 mm) or glass fibres (0.2 mm).

MANUFACTURES AND CHARACTERISTICS OF THE PLATES

The catalytic plates were manufactured in a hydraulic press at a pressure of from 450 to 750 kp/cm$^2$ (44.1 MPa to 73.6 MPa). Length and width, respectively, of the plates used in the hydrogenations were about 150×56 mm, the geometric area in contact with each of the two reactants being 73 cm$^2$.

The inter-particle pores of the plates were dependent on the hydraulic pressure during the manufacture and was determined to between 1 and 5 $\mu$m.

The plates consisted of two different layers, viz. a catalytic layer on the liquid side and a hydrophobic layer on the gas side. The hydrophobic layer which was manufactured from polytetrafluoroethylene particles, pemits a free passage for the gas across this layer to the catalytic layer. The catalytic layer consisted either of a mixture of polytetrafluoroethylene particles and catalyst particles (prior art) or of catalyst particles only (the present invention). Dependent on the thickness and the compositions of the different layers and the placings of the reinforcements mesh the tested plates can be divided into two categories:

(a) Plates according to the prior art (I, II and III), where the catalytic layer was thicker than the polytetrafluorethylene layer. The catalytic layer consisted of catalytic particles as well as polytetrafluoroethylene particles. A nickel mesh was placed within the catalytic layer close to the boundary between the two layers. This structure is shown schematically in FIG. 1a, wherein the reference numeral 1 represents the polytetrafluoroethylene layer and the reference 2 represents the catalytic layer, while 3 relates to said nickel mesh.

Figure 1B:
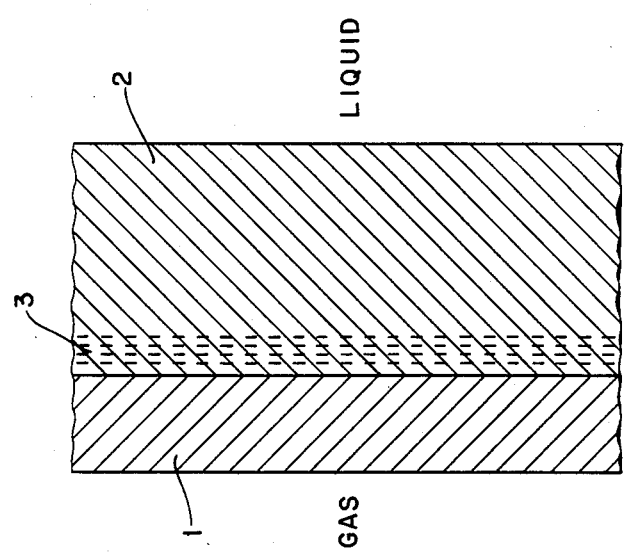

(b) Plates according to the invention (IV, V, VI and VII), wherein the catalytic layer was very thin as compared to the polytetrafluoroethylene layer. The catalytic layer consisted of catalytic particles only. A glass fibre mesh or net was placed in the polytetrafluoroethylene layer. This structure of the plate is shown schematically in FIG. 1b, where the polytetrafluoroethylene layer has been marked with 4, the catalytic layer with 5 and the glass fibre net with 6.

THE REACTOR

Figure 2:
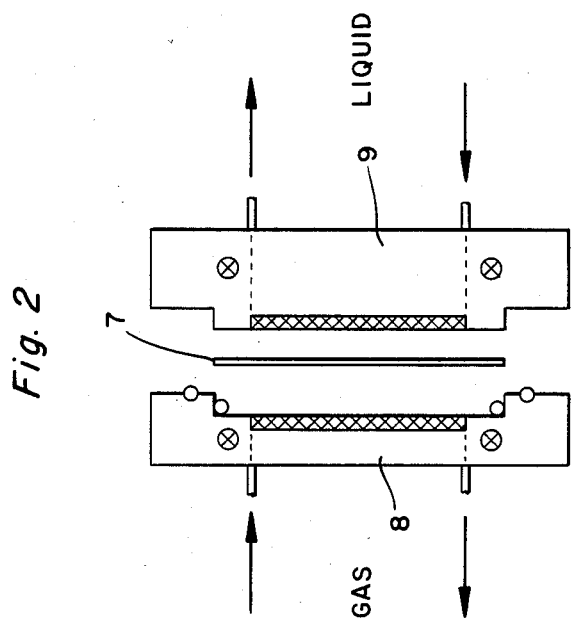
FIG. 2 shows schematically the laboratory reactor wherein a catalyst element in the form of a plate has been utilized to perform the experiments described below.

In the utilized laboratory reactor the catalytic plate was arranged between two thick end plates of stainless steel, as is shown schematically in FIG. 2, where the catalytic plate is numbered 7 and the end plates 8 and 9, respectively, as well as grooves on the interior sides of the end plates for the mounting of meshes or nets which cause a turbulent flow.

HYDROGENATIONS AND ANALYSES

A hydrogenation of p-nitrobenzoic acid in the form of an aqueous solution (100 moles/m$^3$) at 81° C. was used for a determination of the efficiency of the porous plate as a catalyst in a module of the cell reactor. The hydrogen pressure was 9.8 bars. Data for the used plates and the obtained results are presented in Tables 1 and 2, The used catalytic material was commercially available (10% Pd on carbon).

In addition to the powder material the catalyst elements contained a reinforcing mesh of glass fibers (0.2 mm).

TABLE 1

CATALYST ELEMENTS MANUFACTURED IN ACCORDANCE WITH THE PRIOR ART.
Hydrogenation of 0.1 molar p-nitrobenzoic acid.
81° C. Hydrogen pressure 9.8 bars (0.98 MPa).

| | Catalyst | Catalyst layer contents | Catalyst layer thickness, mm | Total thickness of the catalyst element, mm | Reaction rate moles of ABS / s kg Pd |
|---|---|---|---|---|---|
| Example I | 1.9% Pd on NiO/SiO$_2$ | 25% of catalyst incl. carrier 75% of PTFE | 0.58 | 0.70 | 0.011 |
| Example II | 1.9% Pd on NiO/SiO$_2$ | 25% of catalyst incl. carrier 75% of PTFE | 0.35 | 0.50 | 0.138 |
| Example III | 10% Pd on alumina | 33% of catalyst incl. carrier 67% of PTFE | 0.40 | 0.60 | 0.061 |

PTFE = polytetrafluoroethylene
ABS = p-aminobenzoic acid

TABLE 2

CATALYST ELEMENTS MANUFACTURED IN ACCORDANCE WITH THE PRESENT INVENTION
Hydrogenation of 0.1 molar p-nitrobenzoic acid.
81° C. Hydrogen pressure 9.8 bar (0,98 MPa).

| | Catalyst | Catalyst layer thickness * mm | Reaction rate moles of ABS / s kg Pd |
|---|---|---|---|
| Example IV | 10% Pd on alumina | 0.010 | 6.06 |
| Example V | 10% Pd on carbon | 0.005 | 7.39 |
| Example VI | 10% Pd on carbon | 0.005 | 9.46 |
| Example VII | 10% Pd on carbon | ≦0.005 | 22.4 |

PTFE = polytetrafluoroethylene
ABS = p-aminobenzoic acid
* = the total thickness of the catalyst element = 0.45 mm.

SUMMARY

The obtained improvements as to reaction rates are very great and unexpected in the light of the fact that also the catalyst element according to the present invention has a lyophobic and a lyophilic part. Obviously those improvements which were obtained in the experiments and which are improvements as to several exponents are effects of the structure of the catalyst element which is a completely novel structure as compared to the prior art.

EXPERIMENT II

Two experiments were performed with the catalyst element in the form of packing elements for the hydrogenation of p-nitrobenzoic acid to p-aminobenzoic acid in the presence of palladium as a catalyst, the experimental conditions and results being the following:

MATERIALS OF THE CATALYST PACKING ELEMENTS

The material consisted of an inert hydrophobic powder and active metal on a carrier. The inert powder consisted of non-porous particles with a size of 30–50 μm. The carrier particles were porous (average pore diameter 10 nm) and had a particle size of about 5 μm.

MANUFACTURES AND CHARACTERISTICS OF THE PACKING ELEMENTS

A catalyst element was firstly manufactured in the form of a plate. Said plate was prepared in a hydraulic press at a pressure of 750 kp/cm$^2$ (73.6 MPa).

The inter-particle pores of the plate were determined to 2 μm.

The plate consisted of two different layers, viz. a catalytic layer on one side and a hydrophobic layer on the other side. The hydrophobic layer, which was manufactured from polytetrafluoroethylene particles, permits a free passage for the gas through said layer to the catalytic layer. The catalytic layer consisted of catalyst particles only (the present invention).

The catalytic layer which was very thin as compared to the polytetrafluoroethylene layer, consisted of catalytic particles only. A glass fibre mesh was placed within the polytetrafluoroethylene layer. This structure of the plate is presented schematically in FIG. 1b, where the polytetrafluoroethylene layer is numbered 4, the catalytic layer 5 and the glass fibre mesh 6.

The two experiments represent different methods of packing the column by dimensioning the filling or packing elements in the following ways.

(a) The plate was cut into strips with the dimensions 2×400 mm (thickness 0.45 mm).

(b) The plate was cut into strips with the dimensions 2×100 mm (thickness 0.45 mm).

THE REACTOR

The utilizied column, which was a glass tube having a diameter of 50 mm and a height of 370 mm, was packed with the filling or packing elements. To distribute the nitrobenzoic acid flowing downwardly a layer of 3 mm glass beds was arranged on top of the packing elements. In this experiment hydrogen gas was fed concurrently. The total geometric catalyst layer surface was 9.24 dm$^2$.

Figure 3:
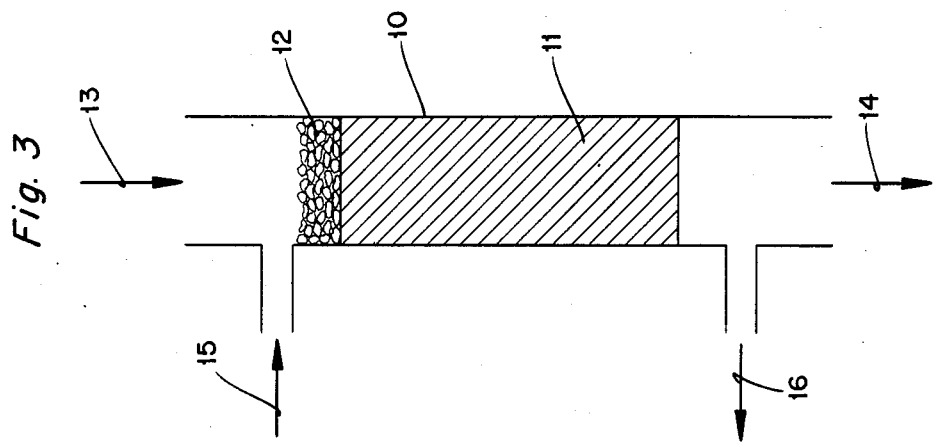
FIG. 3 shows schematically a packed column wherein the catalyst element according to the invention in the form of packing elements has been utilized to perform the experiments described below.

In FIG. 3 a packed column is schematically shown which is numbered 10, wherein the packing elements are placed in space 11 with glass beds 12 for the distribution of the liquid 13 fed to the column. The discharged liquid is numbered 14. The gas flow passed into the column is numbered 15 while the gas flow leaving said column is numbered 16.

HYDROGENATIONS AND ANALYSES

A hydrogenation of p-nitrobenzoic acid in the form of an aqueous solution (100 moles/m$^3$) thereof at 71° C. was utilized for a determination of the efficiency of the reactor as compared to a so-called slurry reactor. The hydrogen pressure was 1.2 bars. Data for the utilized catalyst element and the results obtained are presented in Table 3.

TABLE 3

Catalyst elements in the form of packing elements in a packing column.
Hydrogenation of 0.1 molar p-nitrobenzoic acid
71° C. Hydrogen pressure 1.2 bars (0.12 MPa).

| | Catalyst layer | | Size of packing elements mm | Reactor efficiency percent of slurry reactor |
|---|---|---|---|---|
| | Catalyst | Thickness mm | | |
| Example VIII | 10% Pd on carbon | 0.005 | 0.45 × 2 × 400 | 22 |
| Example IX | 10% Pd on carbon | 0.005 | 0.45 × 2 × 400 | 29 |

SUMMARY

Obviously the improvements obtained which are improvements of several exponents (the literature discloses that packed columns have an efficiency factor of from 0.1 to 1.0% of the slurry reactor) are a consequence of the structure of the catalyst element which is a completely novel structure as compared to that of the prior art.

We claim:

1. A catalyst element for reacting a lyophobic fluid with a lyophilic fluid comprising a porous lyophobic body which has a pore size essentially below 20 μm, a porosity of at least 20% and an exposed surface layer having a thickness of at most 100 μm of lyophilic catalyst particles with a size essentially below 50 μm, across part of its periphery only, said catalyst layer having been formed by sintering and/or pressing the catalyst particles into the porous, lyophobic body.

2. A catalyst element according to claim 1 wherein the catalyst particles have a particle size which is within the range of 5-10 μm.

3. A catalyst element according to claim 1 wherein the catalyst layer has a thickness of at most 50 μm.

4. A catalyst element according to claim 1 wherein the lyophobic body is of a polymeric material.

5. A catalyst element according to claim 1 wherein the catalyst is present in the form of catalyst particles per se or catalyst particles supported by carrier particles.

6. A catalyst element according to claim 1 wherein it is in the form of a plate which is provided with said surface layer of catalyst over that part which is intended to be in contact with the lyophilic fluid.

7. A catalyst element according to claim 1 wherein it is in the form of a packing or filling element intended for use in a packed column.

8. A process for the preparation of a catalyst element according to claim 1 comprising
adhering a surface layer of the lyophilic catalyst to a part of the periphery of the porous lyophobic body by sintering and/or pressing the catalyst particles into said body.

9. A catalyst element according to claim 2 wherein the catalyst layer has a thickness of at most 50 μm.

10. A catalyst element according to claim 2 wherein the lyophobic body is of a polymeric material.

11. A catalyst element according to claim 3 wherein the lyophobic body is of a polymeric material.

12. A catalyst element according to claim 2 wherein the catalyst is present in the form of catalyst particles per se or catalyst particles supported by carrier particles.

13. A catalyst element according to claim 3 wherein the catalyst is present in the form of catalyst particles per se or catalyst particles supported by carrier particles.

14. A catalyst element according to claim 2 wherein it is in the form of a plate which is provided with said surface layer of catalyst over that part which is intended to be in contact with the lyophilic fluid.

15. A catalyst element according to claim 2 wherein it is in the form of a packing or filling element intended for use in a packed column.

16. A process for the preparation of a catalyst element according to claim 2 adhering a surface layer of the lyophilic catalyst to a part of the periphery of the porous lyophobic body by sintering and/or pressing the catalyst particles into said body.

17. A catalyst element according to claim 1 wherein said lyophilic fluid is an aqueous solution of a reactant.

18. A catalyst element according to claim 1 wherein said porous lyophobic body is hydrophobic.

19. A catalyst element according to claim 1 wherein said lyophilic catalyst particles are hydrophilic.

20. A catalyst element according to claim 3 wherein the catalyst layer has a thickness within the range of 5-15 μm.

21. A catalyst element according to claim 4 wherein the polymeric material is polytetrafluoroethylene.

22. A catalyst element according to claim 9 wherein said catalyst layer has a thickness within the range of 5-15 μm.

23. A catalyst element according to claim 10 wherein the polymeric material is polytetrafluoroethylene.

24. A catalyst element according to claim 11 wherein the polymeric material is polytetrafluoroethylene.

* * * * *